United States Patent [19]
Townsend

[11] Patent Number: 4,776,128
[45] Date of Patent: Oct. 11, 1988

[54] OVER-THE-HOLE MOLE TRAP

[76] Inventor: Lyle L. Townsend, 12084 98th Ave. NE., Suite A, Kirkland, Wash. 98034

[21] Appl. No.: 116,632

[22] Filed: Nov. 2, 1987

Related U.S. Application Data

[63] Continuation-in-part of Ser. No. 40,844, Apr. 21, 1987, abandoned.

[51] Int. Cl.[4] .................................... A01M 23/30
[52] U.S. Cl. ................................................. 43/80
[58] Field of Search .......................................... 43/80

[56] References Cited

U.S. PATENT DOCUMENTS

| | | |
|---|---|---|
| 359,454 | 3/1887 | Marlin ........................... 43/80 |
| 689,324 | 12/1901 | Rittenhouse ................... 43/80 |
| 964,877 | 7/1910 | Nepean-Hutchinson ........ 43/80 |
| 1,330,622 | 2/1920 | Corsaw ............................ 43/80 |
| 1,382,125 | 6/1921 | Schroeter ....................... 43/80 |
| 2,009,635 | 7/1935 | Remlinger ...................... 43/80 |
| 2,086,826 | 7/1937 | Smith ............................. 43/80 |
| 2,385,875 | 10/1945 | Moore ............................ 43/80 |
| 2,778,148 | 1/1957 | Schmidt .......................... 43/80 |
| 3,013,358 | 12/1961 | Wilken ............................ 43/80 |
| 4,494,335 | 1/1985 | Gaines ............................ 43/80 |

OTHER PUBLICATIONS

"Mole Control: A Market for PCOs?", Pest Control Technology, Mar. 1987, p. 62.
"GI Plunger Type Mole Trap" of V&L Products, Inc., Woodinville, Wash.

Primary Examiner—M. Jordan
Attorney, Agent, or Firm—Graybeal, Jensen & Puntigam

[57] ABSTRACT

An over-the-hole mole trap which is triggered when a mole ejects dirt from the hole. The trap comprises frame, a spear, a spring, a trigger lever and a trigger plate. The frame has two legs and two vertical guide rods above the legs. The spear is between and parallel to the legs and the guides, and is surrounded by the spring. The trigger lever pivotally depends from one of the guides. The trigger plate is pivoted on the frame below the trigger lever substantially at ground level, and has a central opening receiving the spear, and an outboard portion for retaining the lower end of the trigger lever. The spear is held cocked by a base plate thereof engaging a side notch in the trigger lever. The spear is released when the trigger plate is raised by dirt ejected from the hole, lowering the outboard portion of the trigger plate to free the trigger lever and rfelease the spear to be thrust downwardly by the spring. The outboard trigger lever retaining portion of the trigger plate can be an opening through the plate, or an upstanding lip of the plate.

20 Claims, 4 Drawing Sheets

OVER-THE-HOLE MOLE TRAP

CROSS REFERENCE TO RELATED APPLICATION

This is a continuation-in-part of my earlier U.S. patent application Ser. No. 40,844 filed Apr. 1, 1987, now abandoned and entitled "Over-The-Hole Mole Trap".

BACKGROUND OF THE INVENTION

1. Technical Field

This invention relates to mole traps. More particularly, the invention relates to a mole trap which is placed directly over a mole hole to be triggered when a mole ejects dirt from the hole.

2. Description of the Prior Art

The prior art offers a great number of devices for trapping and killing moles in their tunnels. Typically, a spring-loaded spear or array of spears is placed over a mole tunnel to be thrust through the tunnel, and hopefully through the mole, when the surrounding dirt is displaced by the mole's passage through the tunnel. Some of these traps straddle the tunnel, such as Marlin U.S. Pat. No. 359,454 and Smith U.S. Pat. No. 2,086,826. Others are positioned to one side of the tunnel, such as Moore U.S. Pat. No. 2,385,875. These tunnel type mole traps require correct identification of a tunnel which is actively used by the mole. Persons unfamiliar with the subterranean habits of moles may thus experience difficulty in properly placing the traps. Tunnel type mole traps can endanger children and small animals. When cocked, the spears of these traps are raised above the ground surface, and toes, tails and paws can be speared if the trap is accidentally triggered.

SUMMARY OF THE INVENTION

It is therefore an object of this present invention to provide an improved mole trap which is positioned over mole holes instead of mole tunnels.

It is a further object of this invention to provide a mole trap which, when cocked, positions the end of the spear at or below the ground level.

It is another object of this invention to provide a mole trap which is triggered when a mole ejects dirt from the mole hole.

It is yet another object of this invention to provide a mole trap in which the triggering mechanism is readily adjustable by the user.

It is yet another object of this invention to provide a mole trap which cannot easily be cocked except when the trap is placed in the ground.

These and other objects are provided by an over-the-hole mole trap comprising a frame, a spear, biasing means, triggering means including a trigger lever and a trigger plate, and latching means. The frame is supported on the ground, and has two upstanding spaced apart guides. The spear is spaced between and parallel to the guides. The biasing means biases the spear downwardly with respect to the frame, and is preferably a coil spring encircling the spear. The triggering means triggers the trap when a mole ejects dirt from the hole. The trigger lever is attached to and depends from the frame. The trigger lever has a pointed lower end and a side notch. The trigger plate is supported over the mole hole by the frame pivotally movable about a horizontal axis. The spear passes through an opening in the trigger plate inboard of the pivot axis. A portion of the trigger plate outboard of the pivot axis retains the point of the trigger lever. The latching means latches the spear in a cocked position when the point of the trigger lever is retained by the retainin portion of the trigger plate. The latching means releases the spear to be propelled downwardly by the biasing means when the trigger plate is pivoted so as to lower the trigger lever retaining portion of the trigger plate and release the point of the trigger lever.

DESCRIPTION OF THE PREFERRED EMBODIMENT

Figure 1:
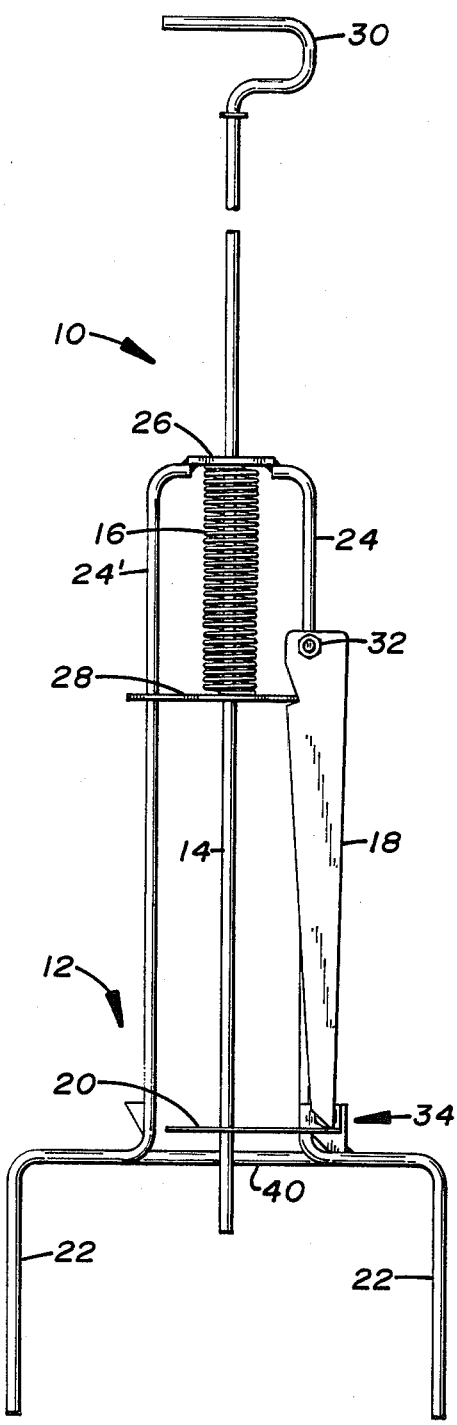
FIG. 1 is a side elevational view of a first embodiment of an over-the-hole mole trap according to this invention with the spear cocked.
Figure 2:
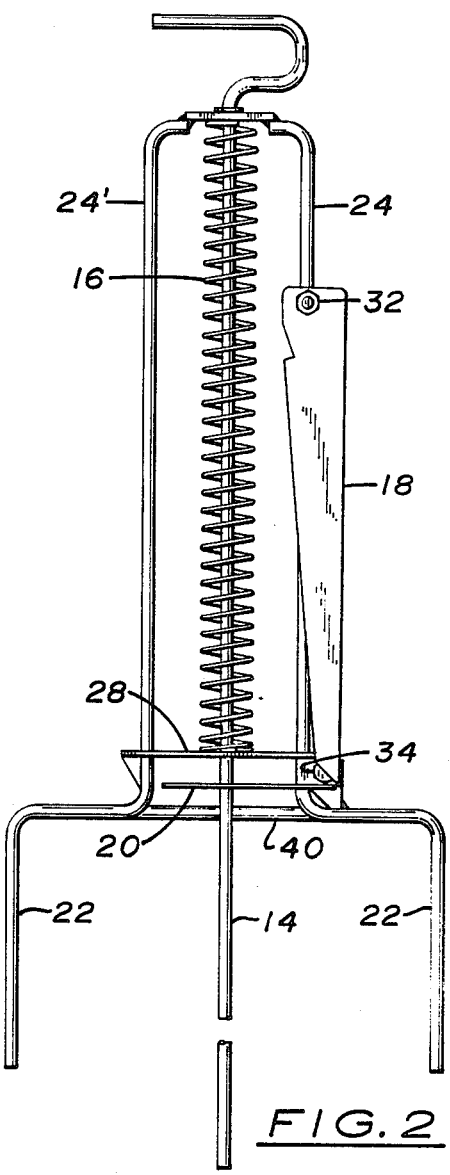
FIG. 2 is a side elevational view of the mole trap of FIG. 1 after the spear has been released.

As seen in FIGS. 1 and 2, a first embodiment 10 of the over-the-hole mole trap of this invention comprises a frame 12, a spear 14, a spring 16, a trigger lever 18, and a trigger plate 20. The frame 12 comprises two upstanding spaced apart legs 22. The legs 22 are preferably L-shaped. The longer stem portions of the legs 22 extend downward into the ground on either side of a mole hole H when the trap is in place. The shorter portions of the legs are perpendicular to the stems of the legs, and point inwardly toward each other. Two upstanding parallel spaced apart guides 24, 24' are affixed perpendicularly to the distal ends of the shorter portions of the legs 22. The guides 24, 24' extend upwardly from the legs substantially parallel to the stems of the legs 22. The length of the guides 24, 24' is preferably at least about twice the length of the stems of the legs 22. The upper ends of the guides 24, 24' are bent inwardly to point toward each other. A top member 26 is affixed to the upper ends of the guides 24, 24', securely joining them. The flat, rectangular top member 26 is pierced by a central opening which receives the spear 14.

Figure 3:
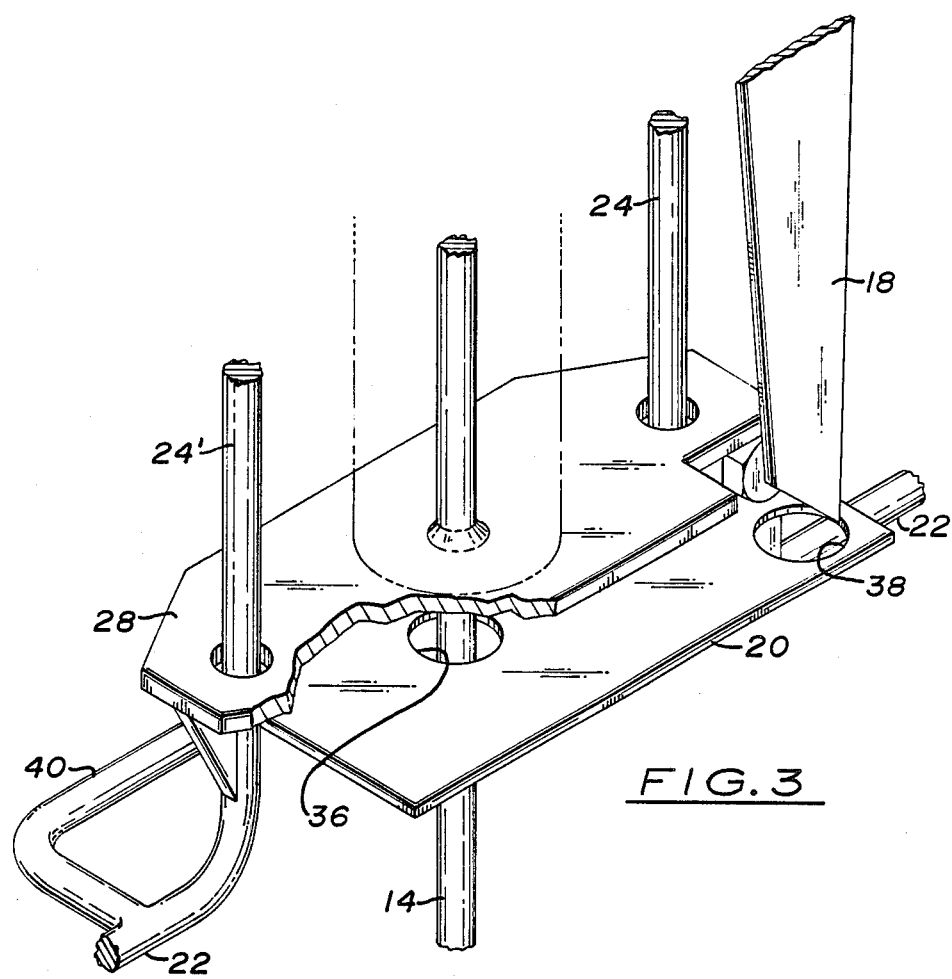
FIG. 3 is a detailed isometric view of the triggering mechanism of the mole trap of FIG. 1.
Figure 4:
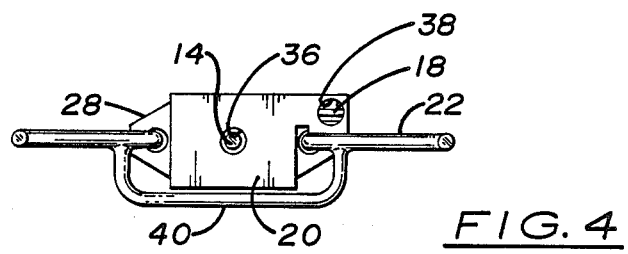
FIG. 4 is a bottom isometric plan view of the mole trap of FIG. 1 showing the trigger plate.

The spear 14 is parallel to and centrally spaced between the guides 24, 24' and the legs 22. When released, the spear 14 extends from above the top member 26 to below the lower stem ends of the legs 22. A flat, substantially rectangular base plate 28 is affixed to the spear 14 about mid-way between its upper and lower ends. As best seen in FIG. 3, two openings in the base plate 28 respectively receive the guides 24, 24'. Thus, the base plate 28 and the top member 26 together align the spear 14 between the guides 24, 24' as the spear is cocked and released. The upper end of the spear 14 is formed into a handle 30 for manually raising the spear 14 into the cocked position.

The present invention includes particularly advantageous latching means and triggering means. The latching means holds the spear 14 in the cocked position until released by the triggering means. The triggering means releases the spear 14 when a mole ejects dirt from the mole hole H over which the trap 10 is set. Referring again to FIGS. 1 and 2, the triggering means comprises the trigger lever 18 and the trigger plate 20. The latching means comprises a notch in the inboard edge of the trigger lever 18, which engages the base plate 28 of the spear 14. When the spear 14 is cocked, a side edge of the base plate 28 interfits within and is retained by the notch in the trigger lever 18, holding the spear in position. When the trap is triggered, the trigger lever 18 is released to swing away from the base plate 28, disengaging the base plate from the notch, and releasing the spear 14 to be thrust downward by the spring 16.

The trigger lever 18 is pivotally attached to one of the guides 24 by a conventional threaded bolt and nut 32. The trigger lever 18 depends downwardly from the bolt and nut 32 to a pointed lower end positioned adjacent the trigger plate 20. The side notch in the trigger lever 18 is positioned below and inboard of the bolt and nut 32.

The trigger plate 20 is pivotally attached to the guide 24 which carries the trigger lever 18 by a trigger pivot bolt 34. The flat substantially rectangular trigger plate 20 is positioned slightly above the shorter portions of the legs 22, and is nominally perpendicular to the spear 14. When the mole trap 10 is placed in the ground, the shorter portions of the legs 22 are adjacent the ground surface and the trigger plate 20 is positioned slightly above the level of the ground surface immediately over the mole hole H. The trigger plate 20 is pivotally attached to the guide 24 about a horizontal axis defined by the trigger pivot bolt 34. The trigger pivot bolt 34 is affixed mutually perpendicularly to the guide 24 and to the shorter portion of the leg 22 attached to the guide. The spear 14 passes through a central opening 36 in the trigger plate 20 located inboard of the axis of the trigger pivot bolt 34. Thus, when the mole trap 10 is in place, both the spear 14 and the trigger plate 20 are positioned over the mole hole H.

When a mole ejects dirt from the mole hole H, the trigger plate is displaced upwardly, releasing the spear 14 which then thrusts downwardly through the central opening 36 in the trigger plate into the mole hole and into the mole. In both embodiments of this invention, the pointed lower end of the trigger lever is retained by a portion of the trigger plate located outboardly of the trigger plate's pivot axis.

In the first embodiment, when the trap 10 is cocked, the lower pointed end of the trigger lever 18 is retained within an outboard opening 38 through the trigger plate 20. An edge of the outboard opening 38 through the trigger plate 20 is located on the opposite side of the trigger pivot bolt 34 from the spear 14. The lower pointed end of the trigger lever 18 is positioned within the outboard opening 38 in the trigger plate 20, with the point engaging the outboard edge of the outboard opening.

When the inboard portion of the trigger plate 20 around the spear 14 is lifted by dirt ejected from the hole H, the edge of the outboard opening 38 in the trigger plate is displaced downwardly below the lower point of the trigger lever, releasing the trigger lever 18 from its restraint within the outboard opening 38. The sensitivity of the triggering means is adjusted by bending the peripheral portion of the trigger plate outboard of the outboard edge of the outboard opening 38 up or down as needed to suitably engage and disengage the lower point of the trigger lever 18.

The second embodiment 110 of the mole trap of this invention differs from the first embodiment 10 in the configuration of the outboard portion of the trigger plate, which engages the pointed lower end of the trigger lever 18. The trigger plate 120 of the second embodiment 110 include an upturned lip 138 outboard of the trigger pivot bolt 34. The trigger plate's outboard lip 138 extends upwardly out of the plane of the trigger plate toward the trigger lever 18. When the trap 110 is cocked, the lower pointed end of the trigger lever 18 engages and is retained by the angled, inboardly facing surface of the upstanding lip 138. As in the first embodiment, when the inboard portion of the second embodiment's trigger plate 120 is lifted by dirt ejected from the hole H, the outboard upstanding lip 138 of the trigger plate is displaced downwardly, disengaging from and releasing the trigger lever 18, and thereby freeing the spear 14 to be thrust downwardly by the spring 16 as described below. The sensitivity of the second embodiment's triggering means is adjusted by bending the upstanding lip 138 of the trigger plate 120 up or down as needed to suitably retain and release the lower point of the trigger lever 18.

The substitution of the second embodiment's upstanding lip 138 for the first embodiment's outboard trigger plate opening 38 provides the second embodiment 110 with a suitably responsive triggering means even under imprecise manufacturing conditions. Additionally, the sensitivity of the trigger means of the second embodiment 110 can be adjusted substantially as readily as can the triggering means of the first embodiment 10.

In both embodiments of this invention, when the trigger lever 18 is released from the outboard opening 38, the trigger lever can swing outwardly away from the spear 14. The pressure of the base plate 28 against the side notch of the trigger lever 18 biases the trigger lever to swing in this outward direction when the mole trap is cocked. When the trigger lever 18 is released from trigger plate 20 to swing outwardly, the side notch disengages the base plate 28 and the spear 14 is freed to be thrust downwardly by the spring 16.

A horizontal brace 40 extends between the inboard ends of the shorter portions of the legs 22. The brace 40 stiffens a lower portion of the mole trap 10, and also provides a convenient foot rest for holding down the trap while the spear 14 is being raised into the cocked position by the handle 30. In the first embodiment 10, as best seen in FIGS. 1-3, the brace 40 is a U-shaped member oriented in a horizontal plane with the free ends each respectively affixed to one of the legs 22.

Figure 5:
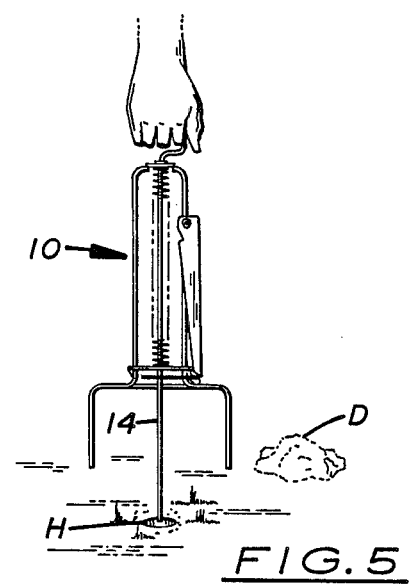
FIG. 5 shows the mole trap of FIG. 1 being placed in the ground above a mole hole.
Figure 6:
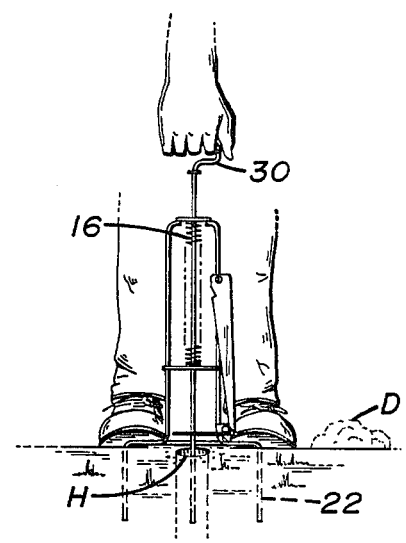
FIG. 6 shows the mole trap of FIG. 5 being cocked.
Figure 7:
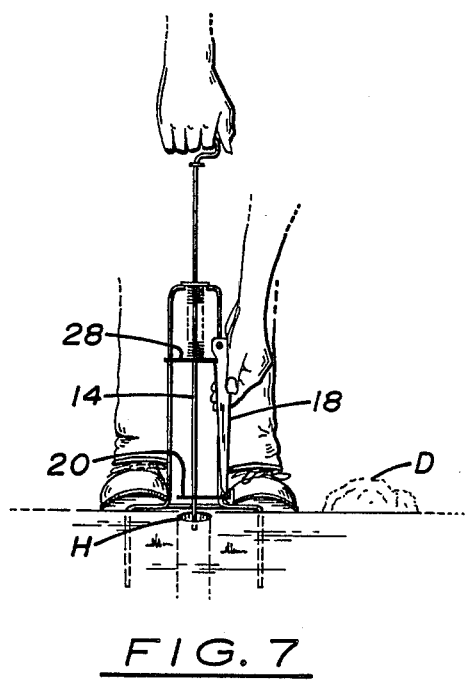
FIG. 7 shows the mole trap of FIG. 6 being latched into the cocked position.

The mole trap 10 is placed in position and cocked as shown in FIGS. 5-7. First, excess dirt D around the mole hole H is removed, leaving a flat ground surface around the opening of the mole hole. The mole trap 10, with the spear 14 released, is held over the mole hole H with the lower end of the spear extending into the hole. The legs 22 are then pressed into the ground on either side of the mole hole H until the brace 40 contacts the ground surface. The user then places one or both feet on the brace 40 or the shorter horizontal portion of the legs 22, in order to hold the mole trap in position while being cocked.

As shown in FIG. 6, the user then raises the handle 30, lifting the spear 14 and compressing the spring 16. When the spring 16 is fully compressed as shown in FIG. 7, the base plate 28 of the spear 14 is in alignment with the side notch of the trigger lever 18. The lower point of the trigger lever 18 is then swung inwardly and positioned within the outboard opening 38 of the trigger plate 20. The inboard portion of the trigger plate 20 around the spear 14 is then lowered, raising the outboard opening 38 around the point of the trigger lever 18. With this done, the spear 14 is latched in the cocked position, and mole trap 10 can be left in place above the hole H to be triggered by the mole as described above.

Figure 10:
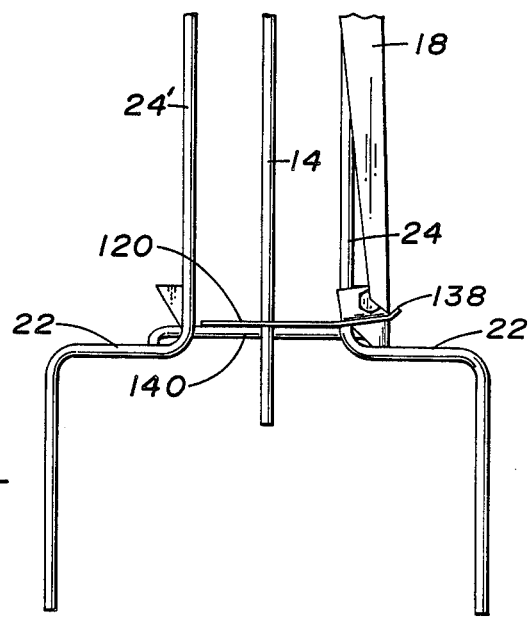
FIG. 10 is a side elevational view of the mole trap of FIG. 9, showing the upturned lip of the trigger plate.

In the second embodiment 110, as best seen in FIG. 10, the brace 140 is a U-shaped member with its free ends aligned horizontally and affixed to respective legs 22. The brace 140 extends upwardly from the legs 22 at an angle of about fifteen degrees (15°). The horizontal crossbar of the U-shaped brace 140 is thus lifted above the level of the shorter, horizontal portions of the legs. This raised brace 140 allows the mole trap of the second embodiment 110 to be used both over the hole H as described above for the first embodiment, and over a mole tunnel near the ground surface and creating a raised furrow.

The trap 110 is placed over the tunnel. The user first flattens the furrow, partially collapsing the tunnel below the furrow. The user then presses the legs 22 into the ground straddling the flattened portion of the furrow until the shorter horizontal portions of the legs 22 contact the ground surface, leaving the crossbar of the brace 140 either in contact with or spaced closely above the flattened top of the furrow, and leaving the spear 14 extending through the furrow and the tunnel. The trap 110 is then cocked as described above for the trap 10 of the first embodiment. In this position, the mole trap 110 will be triggered by the mole as it repairs the collapsed portion of the tunnel below the trap and lifts the top of the furrow, thereby lifting the inboard portion of the trigger plate 120 and releasing the spear 14 as described above.

Figure 8:
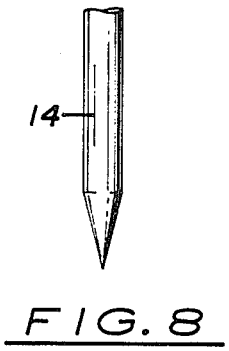
FIG. 8 is a detailed view of an alternative, pointed spear.
Figure 9:
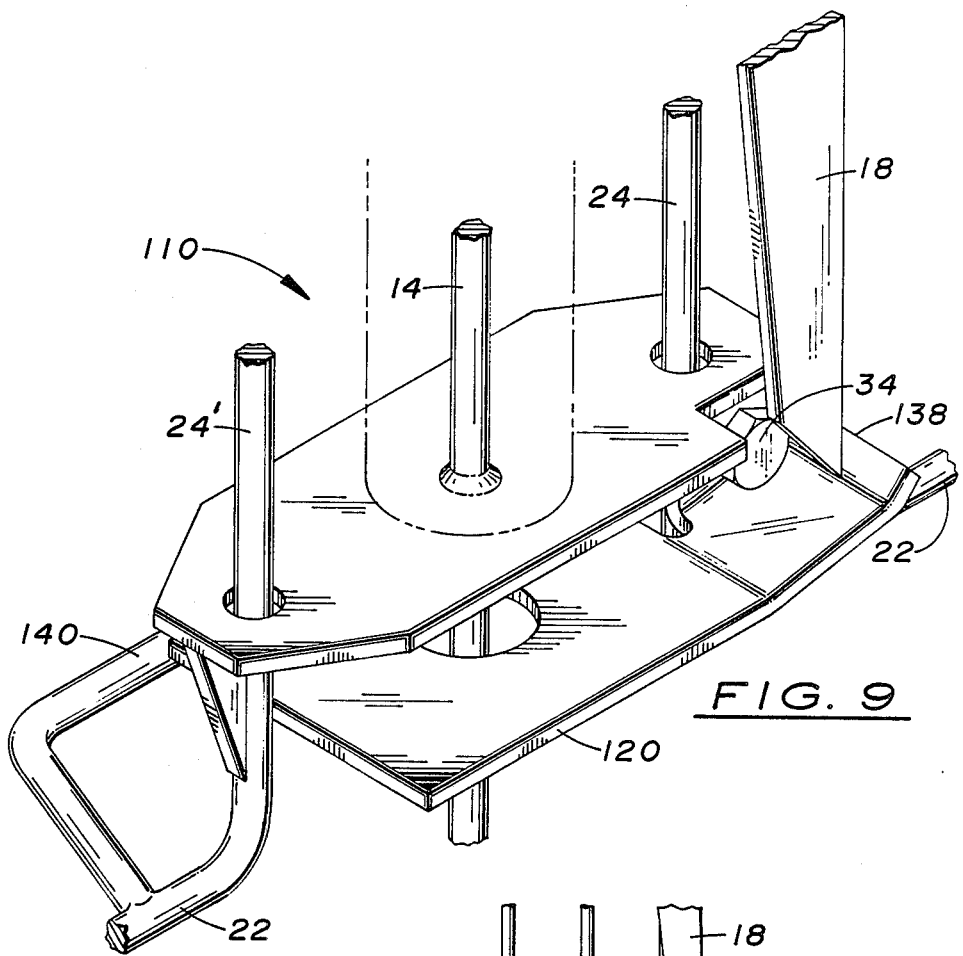
FIG. 9 is a detail isometric view of the triggering mechanism of a second embodiment of an over-the-hole mole trap according to this invention.

The effectiveness of the mole trap of either embodiment can be improved somewhat by sharpening the lower point of the spear 14 as shown in FIG. 8.

It will be appreciated that, although specific embodiments of the invention have been described herein for purposes of illustration, various modifications may be made without departing from the spirit and scope of the invention. Accordingly, the scope of the invention is not limited except by the following claims.

I claim:

1. An over-the-hole trap comprising:
 a frame supportable on the ground, and having two upstanding spaced apart parallel guides;
 a spear spaced between and parallel to said guides alignable with the hole;
 means for biasing said spear downwardly with respect to said frame;
 means for triggering the trap when dirt is ejected from the hole, said triggering means including a trigger lever pivotally attached to and depending from said frame, and a trigger plate supported by said frame pivotally about a horizontal axis;
 a spear passing through an inboard opening in said trigger plate inboard of said axis, said trigger plate having a portion thereof outboard of said axis for retaining the lower end of said trigger lever; and
 means for latching said spear in a cocked position when the lower end of said trigger lever is retained by the trigger lever retaining portion of said trigger plate,
 wherein said triggering means releases said spear to be propelled downwardly by said biasing means when said trigger plate is pivoted so as to lower the trigger lever retaining portion of said trigger plate.

2. A mole trap according to claim 1, wherein said spear extends at least about 1 inch below ground level cocked.

3. A mole trap according to claim 1, wherein said biasing means comprises a coil spring, the spring being confined between a top member joining opposed ends of the guides and a base plate medially affixed to said spear.

4. A mole trap according to claim 3, wherein said latching means comprises a notch in one side of said trigger lever, and the base plate of said spear.

5. A mole trap according to claim 1, wherein said frame includes two downwardly extending spaced apart parallel legs for holding said frame in the ground around the hole.

6. A mole trap according to claim 5, wherein said frame further includes a horizontal brace extending between the legs of the frame.

7. A mole trap according to claim 1, wherein said spear further includes a handle for raising said spear into the cocked position.

8. An over-the-hole mole trap comprising:
 a frame having two upstanding spaced apart legs, two upstanding spaced apart guides fixed to said legs above and parallel thereto, and a top member securely joining upper ends of the guides;
 a spear spaced between and parallel to the legs and the guides;
 means for biasing said spear downwardly with respect to said frame;
 a trigger lever attached to and depending from said frame, said trigger lever having a lower end point;
 a generally planar trigger plate supported by said frame pivotally about a horizontal axis said spear passing through an opening in said trigger plate inboard of said axis, said trigger plate having a portion thereof outboard of said axis for retaining the point of said trigger lever; and
 means for latching said spear in a cocked position when the point of said trigger lever is retained by the retaining portion of said trigger plate, and for releasing said spear to be propelled downwardly by said biasing means when said trigger plate is pivoted so as to lower the trigger lever retaining portion of said trigger plate.

9. A mole trap according to claim 1, wherein said spear extends at least about 1 inch below said trigger plate when cocked and at least about 8 inches below said trigger plate when released.

10. A mole trap according to claim 1, wherein said latching means comprises a notch in one side of said trigger lever and an interfitting member fixed to said spear.

11. A mole trap according to claim 1, wherein said biasing means comprises a coil spring concentrically surrounding said spear and confined between the top member of said frame and a base plate medially affixed to said spear.

12. A mole trap according to claim 4, wherein said latching means comprises the base plate of said spear and a notch in one side of said trigger lever.

13. A mole trap according to claim 4, wherein the base plate has two openings therethrough for respectively receiving and slidably engaging the guides of said frame.

14. A mole trap according to claim 6, wherein said frame further includes stop means affixed to said frame closely adjacent the legs for limiting the downward movement of said spear.

15. A mole trap according to claim 1, wherein said frame further includes a horizontal brace extending between the legs of the frame.

16. A mole trap according to claim 1, wherein said spear further includes a handle for raising said spear into the cocked position.

17. A mole trap according to claim 1, wherein said top member comprises a plate having opposite ends each affixed to one of the guides, and a central opening for receiving said spear.

18. A mole trap according to claim 1, wherein the trigger lever retaining portion of the trigger plate comprises an opening outboard of the horizontal pivot axis of the trigger plate, said opening receiving and retaining the point of the trigger lever.

19. A mole trap according to claim 1, wherein the trigger lever retaining portion of the trigger plate comprises an upstanding lip of the trigger plate outboard of the horizontal pivot axis of the trigger plate.

20. A mole trap according to claim 1, wherein said latching means comprises a notch in one side of said trigger lever and an interfitting member affixed to said spear.

* * * * *